United States Patent [19]

Hoppe et al.

[11] 3,900,651

[45] Aug. 19, 1975

[54] HEAVY DUTY SANDWICH ELEMENT

[75] Inventors: Peter Hoppe, Troisdorf; Gustav Drouven, Bensberg; Martin Wandel, Dormagen; Ernst Gutschik, Dormagen; Dieter Brokmeier, Dormagen, all of Germany

[73] Assignee: Bayer Aktiengesellschaft, Leverkusen, Germany

[22] Filed: Oct. 31, 1973

[21] Appl. No.: 411,521

[30] Foreign Application Priority Data

Nov. 11, 1972 Germany ........................... 2255454

[52] U.S. Cl. ....................... 428/86; 264/45; 428/90; 428/92; 428/218

[51] Int. Cl. ........................... B32b 3/14; B32b 3/26

[58] Field of Search ............ 161/53, 159, 161, 160, 161/64, 67; 264/45

[56] References Cited

UNITED STATES PATENTS

| | | | |
|---|---|---|---|
| 3,546,060 | 12/1970 | Hoppe et al. | 161/159 |
| 3,591,444 | 7/1971 | Hoppe | 161/53 |
| 3,686,046 | 8/1972 | Crowley | 156/79 |

*Primary Examiner*—William J. Van Balen

*Attorney, Agent, or Firm*—Lawrence S. Pope

[57] ABSTRACT

Improved heavy duty sandwich elements having a. a surface layer b. a layer of adhesive applied to the surface layer and in which flock fibers of varying lengths are embedded, and c. a foam core adjacent the adhesive layer, into which foam core the flock fibers extend, with the layer of adhesive and fibers; and which forms a marginal zone wherein the foam core has a density that decreases continuously from the marginal zone to the interior of the foam core.

8 Claims, 9 Drawing Figures

HEAVY DUTY SANDWICH ELEMENT

BACKGROUND OF THE INVENTION

This invention relates to sandwich elements designed to withstand high stresses and more specifically to sandwich elements consisting of a surface layer which is covered on the back with a layer of adhesive in which flock fibers are embedded which fibers extend into a core of foam resin which has been foamed in situ underneath the surface layer.

Such sandwich elements, also known as composite constructions, are used e.g. as parts of car bodies and crash pads in the motor car and carriage industry, in aircraft construction and for use as walls and the like in the building industry.

The surface layers consist of thin metal foils or plastics foils. They may be formed by introducing a synthetic resin which can be hardened by curing such as a polyester or epoxy resin, into a mold as a separate application and hardening it in the mold.

A layer of adhesive is applied to the surface layer and a fiber fleece is pressed into the layer of adhesive. If the surface layer is applied as a separate application, this fiber fleece may be pressed into it while it is still soft. The fiber fleece consists of a combination of several individual fleeces which are preferably stitched together so that when a reactive foaming mixture, preferably a mixture based on polyurethane, is foamed up to permeate the fleece, the density of the marginal zone of the foam core decreases more or less continuously from the outside of the core to the inside of the core. Sandwich elements which are capable of withstanding high stresses are obtained in this way.

The use of fiber fleeces has, however, the disadvantage that pressures of about 2 to 3 excess atmospheres are required for filling the space below or inside the surface layers with foam in order that the fiber fleece will be completely permeated with foam. When this method is used for large parts such as parts of car bodies which are produced as an endless web on a double conveyor belt or in a mold, considerable forces are produced which must somehow be absorbed.

It is also known to cover the internal surface of the surface layers with a layer of adhesive and introduce flock fibers into this adhesive layer by flocking. The surface layer is thereby firmly anchored in the foam core and moreover this method of flocking is intended to achieve a homogeneous marginal zone on the core of the foam. In order to achieve this object, fibers of equal length have been used. This inevitably resulted in a very pronounced marginal zone of high density with the low density of the core immediately adjacent thereto. Flocking was carried out mechanically or preferably electrostatically by the usual processes.

In the first mentioned construction, in which fiber fleeces of different weights per unit area are arranged in layers, a high modulus of elasticity is obtained by the approximately continuous decrease in density in the marginal zone. The modulus of elasticity obtained when using flock fibers of equal length, however, as fiber reinforcement is too low for the purposes of heavy duty sandwich elements.

It is therefore an object of this invention to provide heavy duty sandwich elements which require the application of only low pressures during the foaming process but in which the marginal zone of the foam core nevertheless has an approximately continuous decrease in density so that a high modulus of elasticity is obtained in the finished product.

SUMMARY OF THE INVENTION

According to the invention, this problem is solved by using flock fibers of at least two different lengths so that the density of the marginal zone of the foam core decreases substantially continuously to the interior of the core. When this is achieved, lighter constructions can be used for the molding tool or for the double conveyor belt which serves as mold for the production of web goods because the tool or mold is then only required to withstand relatively small forces because the foaming pressures produced are only about 0.5 to 1.5 excess atmospheres. At the same time, the density in the interior of the foam core is reduced since this depends mainly on the foaming pressure. The whole construction of the sandwich element can be adapted to the special requirements of a given case by suitable choice of the different fiber lengths, fiber thicknesses and amounts applied according to the nature of the surface layers and the formulations of the components of the foaming mixture, i.e. the nature of the foam resin. This provides the possibility of a wide range of variation. The fibers of different lengths may be flocked in separate applications or alternatively a mixture of fibers of different lengths may be applied together. The fact that the fibers cannot be cut to exactly specified lengths but cover a wide range of lengths is an advantage rather than a disadvantage because the resulting variation in density of the marginal zone then tends to be more continuous. It is also possible to apply fiber mixtures in which the intervals between the successive lengths of fibers is very small but in that case the mixture of fibers must be very homogeneous in order to ensure homogeneous distribution of the different fiber lengths in the flocking process.

According to one particular embodiment of the process, the flock fibers may be applied in different packing densities in certain localized zones. For example, if certain areas of the sandwich element are expected to be subjected to exceptionally high stresses, these areas will require to have a marginal zone of higher density so that a larger quantity of flock fibers per unit surface area will be required in these areas.

According to another embodiment of the invention, the flock fibers have greater variations in length in certain localized areas. If, for example, the surface layers are normally flocked with fibers having a length of 4 mm and 8 mm, a third length of fibers, for example 12 mm, may be provided in localized areas. These areas will then have a different density gradient and a marginal zone of different thickness.

The flock fibers are preferably synthetic organic or inorganic fibers, natural fibers or metallic fibers. Glass fibers are also particularly suitable for obtaining constructions of high strength and surface layers which are particularly firmly anchored to the core.

In order to achieve a high density in the marginal zone of the foam core, the flock fibers preferably consist at least partly of crimped fibers. In that case, the fibers may be crimped before they are applied or they may be crimped by heat after they have been applied. The last mentioned type of fibers gives rise to fewer difficulties in the flocking process.

According to another embodiment of the invention, the interior of the foam core is reinforced with a high bulk fibrous structure. Such reinforcements are already known per se but when used in conjunction with flock fibers in the marginal zone they provide the special advantage that the loops of the fibers in this fibrous structure penetrate the spaces between the flock fibers and thereby improve the transition from the marginal zone to the interior of the core.

The foam core may be formed from virtually any reactive foaming mixture, but is preferably a mixture based on polyurethanes. Such foams are well known in the art and may be polyester or polyether urethane foams prepared by reacting polyhydroxyl compounds with a polyisocyanates generally in the presence of blowing agents, stabilizers and the like.

Suitable adhesives for the adhesive layer are, for example, those known for the production of sandwich elements and based on epoxy resins, polyurethanes or cyanates which are capable of sudden completion of their reaction by a thermal impact at about 120° to 140°C.

It has been found suitable to use flock fibers with lengths ranging from 2 to 15 mm but in special cases even longer fibers with a length of up to 20 mm or more. The total quantity of flock fibers applied advantageously ranges from about 30 to 1200 g/m$^2$ but may in exceptional cases be even much more, for example up to 1500 g/m$^2$. When using organic fibers, e.g. polyamide fibers, the total quantity of fibers will normally be not more than 700 g/m$^2$ and in the case of metallic fibers not more than 1200 g/m$^2$. Flocking may be carried out fully automatically. The high degree of uniformity thereby achieved enables the breaking strength of the thin surface layer of the sandwich to be raised to the tensile strength of the material, the necessary thickness of the surface layer for this purpose being calculated from the rigidity, which in turn depends on the constructionally possible thickness of the core. One aims to obtain a support core with minimum density in the interior with a view to obtaining a lightweight structure. The thickness of the surface layer will normally be in the region of about 0.1 to 2 mm in the case of metal and up to 8 mm in the case of synthetic resin.

The surface layers consist of thin metal foils or plastic foils known in the art for this purpose. It has been found advisable to increase the diameter of the fibers, i.e. the titre, with increasing length of the fibers because in the foaming process, forces are produced which are liable to subject the flock fibers to a bending stress which depends on the direction of flow. The object is to obtain a perpendicular orientation of the flock fibers as far as possible or a random, unorientated oblique positioning of the fibers except where a particular oblique orientation is required locally to take up increased stresses. The quantity of adhesive to be applied should also be adapted to the length of the fibers in order to ensure that they will be firmly embedded.

The sandwich elements of the invention are produced by methods known in the art such as those described in the background of this invention.

BRIEF DESCRIPTION OF THE DRAWINGS

Various examples of the sandwich element according to the invention and comparison examples are illustrated in the drawings, in which.

DESCRIPTION OF THE PREFERRED EMBODIMENTS

Figure 1:
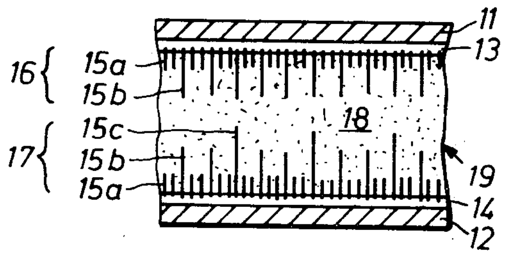
FIG. 1 represents a cross-section through a portion of a sandwich element with different fibers flocked into the marginal zone of the foam core.
Figure 8:
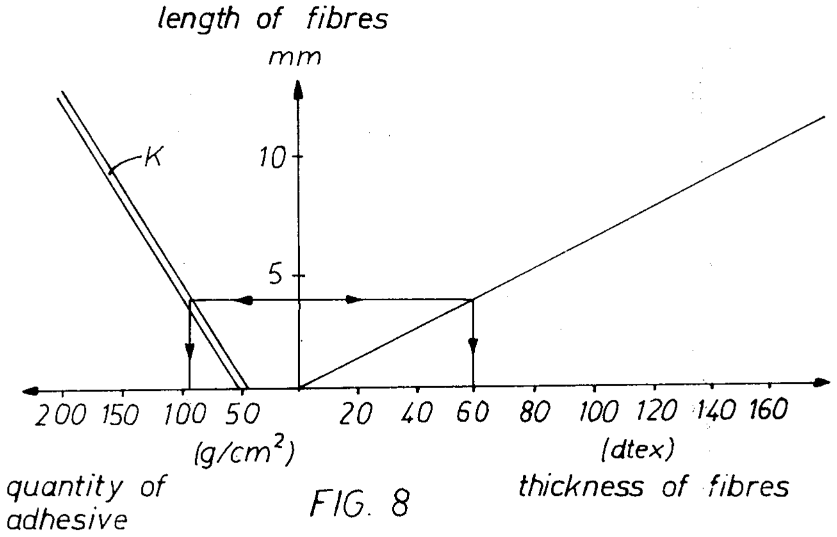
FIG. 8 is a diagram to determine the quantity of adhesive required in dependence upon the length and thickness of polyamide fibers.

Going now to the drawings:

In FIG. 1, the back of each surface layer 11, 12 which are aluminum sheets is covered with a 0.2 mm thick layer of adhesive 13, 14 based on polyurethane. Polyamide fibers 15a and 15b which have a length of 4 mm and 8 mm, respectively, are introduced into the layer of adhesive 13 by electrostatic flocking, the amount applied being (in each case) 100 g/m$^2$. The thickness of the flock fibers 15a which are 4 mm in length is 60 dtex and the amount applied is 150 g/m$^2$; that of the flock fibers 15b which are 8 mm in length is 110 dtex and the amount applied is 60 g/m$^2$. The amount of adhesive applied in layer 13 is 150 g/m$^2$ so that it will be sufficient for the longest fibers, which are 8 mm in length, as represented in FIG. 8. The flock fibers 15a, 15b and 15c embedded in the layer of adhesive 14 consist of fibers 4 mm in length and 60 dtex in thickness, 8 mm in length and 110 dtex in thickness and 12 mm in length and 150 dtex in thickness. The amount of fibers 15a applied is 150 g/m$^2$, that of fibers 15b 60g/m$^2$ and that of fibers 15c 25 g/m$^2$. The amount of adhesive in layer 14 is 200 g/m$^2$. The specific density of the marginal zone 16 is 0.5 g/cm$^3$ in the region of the 4 mm fibers, 15a and 0.2 g/cm$^3$ in the adjacent zone into which the fibers 15b extend. The specific density of the marginal zone 17 is 0.6 g/cm$^3$ in the region of fibers 15a which are 4 mm in length, 0.3 g/cm$^3$ in the adjacent zone into which fibers 15b which are 8 mm in length extend and 0.1 g/cm$^3$ in the zone into which the 12 mm fibers 15*c* extend. The density of the fiber-free interior 18 of the core 19 is 0.05 g/cm³ and the average density of the foam core is 0.12 g/cm³.

Figure 2:
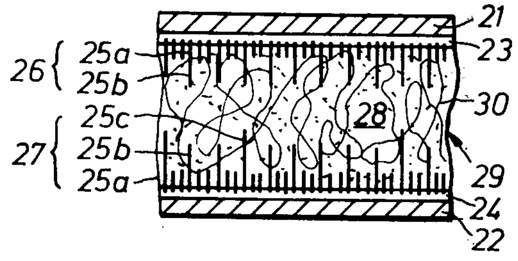
FIG. 2 represents a cross-section through a portion of a sandwich element which in addition has a reinforcement in the core.

The sandwich element in FIG. 2, which comprises the surface layers 21, 22, the adhesive layers 23, 24 and the flock fibers 25*a*, 25*b* and 25*c* is built up in the same way with marginal zones 26, 27 and a core 29 but the interior 28 of this core is reinforced with a high bulk fiber deposit 30 which consists of a continuous filament. The individual loops of this filament extend into the marginal zones 26, 27 which are reinforced with flock fibers 25*a*, 25*b* and 25*c*. The specific densities of the various regions of different fiber lengths in the marginal zones 26 and 27 are thereby increased so that they are about 10% higher than the corresponding regions in the marginal zones 16, 17 of FIG. 1. In the core 29, i.e. in the region of the fiber reinforcement 30, the density is 0.07 g/cm³ and the average density of the foam core is 0.15 g/cm³.

Figure 3:
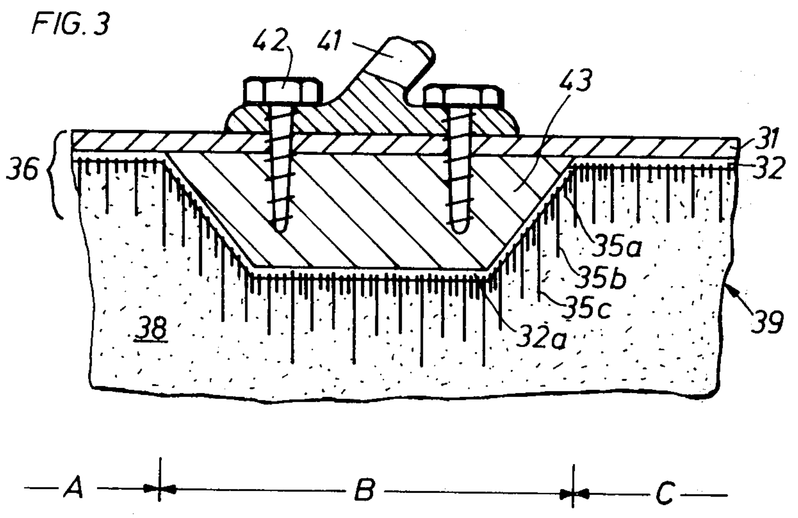
FIG. 3 represents a cross-section through a portion of a sandwich element in an area designed to take up localized increased stresses and therefore provided with a stronger reinforcement of the marginal zone of the foam core.
Figure 4:
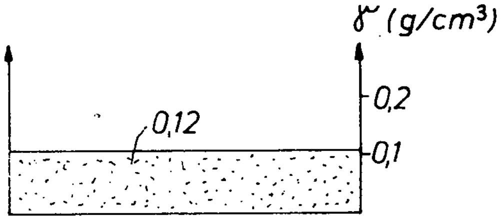
FIG. 4 represents the distribution of density over the thickness of a foam core without reinforcement in accordance with the known art, given as comparison example.

In FIG. 3, a support 41 is attached to the sandwich element by screws 42 and a reinforcing insert 43 is provided under a surface layer 31 in the region of the screws 42. The layer of adhesive 32 at the back of the surface layer 31 is continued over the back of the reinforcing insert 43 as layer 32*a*. In the zones A and C, the structure of the marginal zone 36 corresponds to that of the sandwich element shown in FIG. 1 but in zone B the total weight of the flock fibers per surface area is 300 g/m². This means that flock fibers 35*a*, 35*b* of the same length as in zones A and C were used but with the addition of longer fibers 35*c*. Moreover, the fibers were more densely packed. The specific density is therefore higher in zone B of the marginal zone 36, namely 0.75 g/cm³ in the region of the shortest fibers 35*a*, 0.4 g/cm³ in the adjacent region of fibers 35*b* and 0.2 g/cm³ in the next region which contains fibers 35*c*. The interior 38 of the core 39 has a uniform specific density of 0.055 g/cm³.

The various polyurethane foam cores represented in FIGS. 4 to 7 all have a width of 60 mm and an average specific density of 0.12 g/cm³. The foam core represented in FIG. 4 has no fibrous reinforcement and has a uniform density of 0.12 g/cm³. The elastic modulus of this core is 200 kg/wt/cm².

Figure 5:
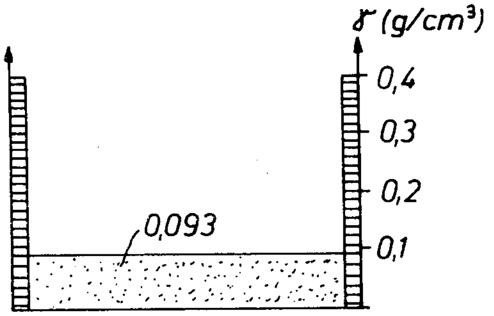
FIG. 5 represents the distribution of density over the thickness of a foam core which has a marginal zone reinforcement consisting of flock fibers of equal length in accordance with the known art.

The foam core represented in FIG. 5 is flocked with polyamide fibers which are uniformly 4 mm in length and have a thickness of 60 dtex, the amount of fibers applied being 150 g/m². The specific density in the marginal zone, i.e. in the region of the fibers, is 0.4 g/cm³ while the density of the core is only 0.093 g/cm³. The elastic modulus of the core is 455 kg/wt/cm².

Figure 6:
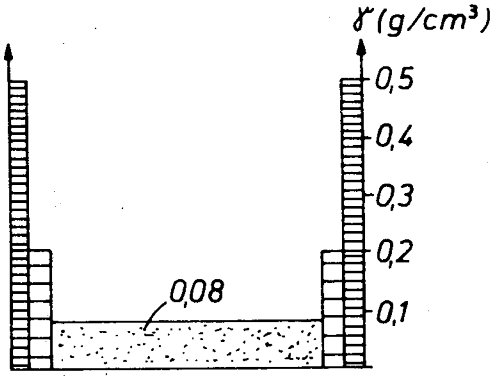
FIG. 6 represents the distribution of density over the thickness of a foam core of a sandwich element according to the invention which is provided with a marginal zone reinforcement consisting of flock fibers with two different lengths.

In FIG. 6, the foam core is reinforced with flock fibers of two different lengths. In the region of the fibers which have a length of 4 mm and a thickness of 60 dtex and in which the weight of the fibers applied is 150 g/m², the specific density is 0.5 g/cm³ because fibers with a length of 8 mm and thickness of 110 dtex are flocked in between the shorter fibers in a quantity of 80 g/cm². The elastic modulus of the core is 620 kg/wt/cm².

Figure 7:
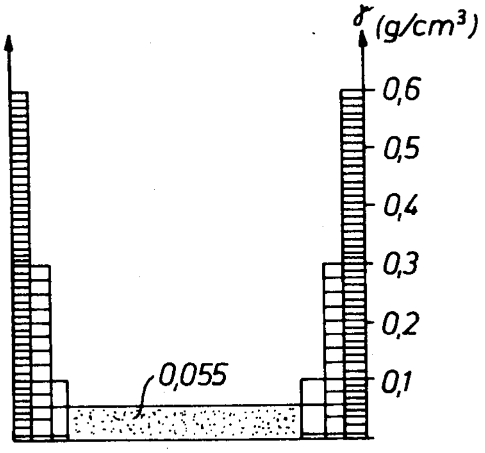
FIG. 7 represents the distribution of density over the thickness of a foam core of a sandwich element according to the invention which has a marginal zone reinforcement consisting of flock fibers with three different lengths.

In the foam core represented in FIG. 7, the specific density of the marginal zone is even higher due to the insertion of a third set of fibers 12 mm in length and 150 dtex in thickness which are applied in an amount of 25 g/m². The density is 0.6 g/cm³ in the region of the 4 mm fibers, 0.3 g/cm³ in the adjacent region of the 8 mm fibers and 0.1 g/cm³ in the next region of 12 mm fibers. The density of the fiber-free interior of the core is 0.055 g/cm³. The elastic modulus of the core is 110 kg/wt/cm².

The diagram in FIG. 8 which is used to determine the quantity of adhesive required depending on the length and thickness of the fibers is applicable in principle to all synthetic fibers since they all have substantially the same rigidity properties. For softer or harder fibers, the gradient or course of curve K must be determined empirically by experiments. It goes without saying that in view of the many factors which come into play it is necessary to allow a plentiful application of adhesive in order to ensure that the fibers will be firmly embedded. Thus, for example, the depth to which the fibers will be embedded in the adhesive depends also on the viscosity of the adhesive at the moment of flocking. The method of determining the required quantity by means of the diagram may therefore be carried out with a wide range of tolerance and does not require absolute accuracy.

Figure 9:
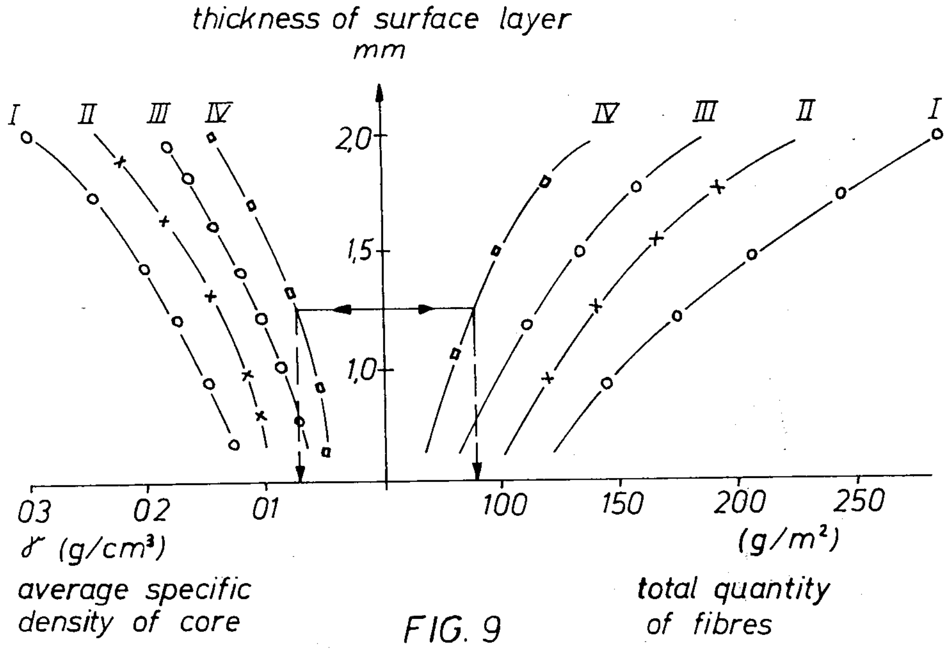
FIG. 9 is a diagram representing the dependence of the specific density of the foam core upon the thickness of the sandwich element and upon the quantity of fibers per unit surface area when polyamide fibers are used.

In FIG. 9, the required average specific density of the foam core increases with increasing elastic modulus of the surface layer and with increasing thickness of this layer. The diagram represented here applies to a core of polyurethane foam and a reinforcement of polyamide flock fibers. The curves of the diagram apply to the following moduli of elasticity:

I:E = 2.1 . 10⁶ kg/wt/cm² (steel)

II:E = 0.75 . 10⁶ kg/wt/cm² (light metal)

III:E = 0.15 . 10⁶ kg/wt/cm² (glass fiber reinforced synthetic resin)

IV:E = 0.025 . 10⁶ kg/wt/cm² (thermoplastic resin)

What is claimed is:

1. In a heavy duty sandwich element having:

a. a surface layer b. a layer of adhesive applied to the surface layer and having flock fibers embedded therein, and c. a foam core adjacent the layer of adhesive and into which the flock fibers extend, said foam core forming a marginal zone with the layer of adhesive and flock fibers, the improvement comprising flock fibers of varying lengths whereby the density of the marginal zone of the foam core decreases approximately continuously to the interior of the core.

2. The sandwich element of claim 1, wherein the flock fibers have diameters that vary with the length of the fibers.

3. The sandwich element of claim 1, wherein the flock fibers have locally differing densities.

4. The sandwich element of claim 1, wherein the flock fibers have local variations in length.

5. The sandwich element of claim 1, wherein the quantity of flock fibers is 30 to 1200 g/m².

6. The sandwich element of claim 1, wherein the flock fibers are synthetic, organic, natural or metallic fibers.

7. The sandwich element of claim 1, wherein at least a part of the flock fibers are crimped fibers.

8. The sandwich element of claim 1, wherein the interior of the foam core is reinforced with a high bulk fibrous structure.

* * * * *